(12) United States Patent
Phillips et al.

(10) Patent No.: US 8,775,001 B2
(45) Date of Patent: Jul. 8, 2014

(54) MOTORIZED WHEELCHAIR INTERLOCK (76) Inventors: Alan C. Phillips, Crestline, CA (US);
Craig A. Phillips, Crestline, CA (US);
Kevin C. Fisher, Yucaipa, CA (US)

(*) Notice: Subject to any disclaimer, the term of this patent is extended or adjusted under 35 U.S.C. 154(b) by 162 days.

(21) Appl. No.: 13/619,232

(22) Filed: Sep. 14, 2012

(65) Prior Publication Data
US 2013/0218380 A1    Aug. 22, 2013

Related U.S. Application Data (60) Provisional application No. 61/600,526, filed on Feb. 17, 2012.

(51) Int. Cl.
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
USPC ................... 701/22; 29/825; 307/9.1

(58) Field of Classification Search
USPC ......... 701/22, 36, 1, 28, 4, 79, 42, 70, 23, 50, 701/72, 82, 3, 59, 29.2, 12, 66; 29/825, 29/401.1, 40.1, 402.03; 307/9.1, 38, 104; 180/268, 167, 65.51, 236, 41, 8.2, 21, 180/907
See application file for complete search history.

(56) References Cited

U.S. PATENT DOCUMENTS

| 4,078,627 | A * | 3/1978 | Brown et al. ................. 180/6.5 |
| 4,369,397 | A * | 1/1983 | Read ............................. 318/54 |
| 5,086,870 | A * | 2/1992 | Bolduc ....................... 180/333 |
| 5,409,074 | A * | 4/1995 | Wilson et al. ................ 180/6.5 |
| 5,635,807 | A * | 6/1997 | Lautzenhiser ............... 318/625 |
| 6,176,335 | B1 * | 1/2001 | Schaffner et al. ........... 180/65.1 |
| 6,571,892 | B2 * | 6/2003 | Kamen et al. ................ 180/8.2 |
| 6,948,398 | B2 * | 9/2005 | Dybro ....................... 74/471 XY |
| 6,992,602 | B2 * | 1/2006 | Alexander et al. ............. 341/22 |
| 7,347,299 | B2 * | 3/2008 | Billger et al. ................ 180/326 |
| 7,748,490 | B2 * | 7/2010 | Hornick et al. .............. 180/316 |
| 8,065,051 | B2 * | 11/2011 | Chopcinski et al. ........... 701/36 |
| 8,186,700 | B2 * | 5/2012 | Li et al. ..................... 280/250.1 |
| 8,297,384 | B2 * | 10/2012 | Wanger et al. ............... 180/14.2 |
| 8,430,192 | B2 * | 4/2013 | Gillett ....................... 180/65.51 |
| 8,487,872 | B2 * | 7/2013 | McAlindon .................. 345/161 |
| 8,531,182 | B2 * | 9/2013 | Banerjee ................. 324/207.25 |
| 8,614,667 | B2 * | 12/2013 | McAlindon .................. 345/157 |
| 8,622,160 | B2 * | 1/2014 | Flowers ...................... 180/65.1 |
| 2002/0121394 | A1 * | 9/2002 | Kamen et al. ................. 180/41 |
| 2005/0279539 | A1 * | 12/2005 | Chiou et al. ................ 180/65.1 |
| 2007/0020013 | A1 * | 1/2007 | McAlindon .................. 400/489 |
| 2007/0056782 | A1 * | 3/2007 | Chopcinski et al. ......... 180/65.1 |
| 2007/0074923 | A1 * | 4/2007 | Billger et al. ................ 180/330 |
| 2007/0198109 | A1 * | 8/2007 | Morrell ......................... 700/90 |
| 2008/0161733 | A1 * | 7/2008 | Einav et al. .................... 601/34 |
| 2008/0202837 | A1 * | 8/2008 | Macedo Ribeiro et al. .. 180/236 |
| 2008/0315866 | A1 * | 12/2008 | Banerjee .................. 324/207.2 |

(Continued)

*Primary Examiner* — Thomas Black
*Assistant Examiner* — Robert Payne
(74) *Attorney, Agent, or Firm* — Nydegger & Associates (57) ABSTRACT A control system for a powered wheelchair that detects when a user is in a first orientation to cause movement of the powered wheelchair. The control system inhibits movement of the wheelchair when the user is not in the first orientation.

20 Claims, 6 Drawing Sheets (56) References Cited

U.S. PATENT DOCUMENTS

| | | | |
|---|---|---|---|
| 2009/0062698 A1* | 3/2009 | Einav et al. | 601/5 |
| 2009/0309747 A1* | 12/2009 | Ghovanloo et al. | 340/686.1 |
| 2010/0066056 A1* | 3/2010 | Li et al. | 280/304.1 |
| 2010/0174432 A1* | 7/2010 | Meyer | 701/22 |
| 2012/0064502 A1* | 3/2012 | Chopcinski et al. | 434/365 |
| 2012/0130590 A1* | 5/2012 | Chopcinski et al. | 701/36 |
| 2013/0175103 A1* | 7/2013 | Flowers | 180/65.1 |
| 2013/0218380 A1* | 8/2013 | Phillips et al. | 701/22 |

* cited by examiner

MOTORIZED WHEELCHAIR INTERLOCK

This application claims the benefit of U.S. Provisional Patent Application Ser. No. 61/600,526, filed Feb. 17, 2012.

FIELD OF THE INVENTION

The present invention relates to wheelchairs and, in particular, concerns an interlock device that inhibits unintentional movement of the wheelchair,

BACKGROUND OF THE INVENTION

Motorized wheelchairs are becoming, increasingly popular for people with ambulatory difficulties. Typically, these chairs include a chair that receives a user and typically two or more sets of wheels. Generally, the set of drive wheels are individually powered by motors and the secondary set of wheels are casters for stability. The motors can provide variable amounts of power to each of the wheels so that providing the same amounts of power to both wheels propels the wheelchair forward or backward. The wheelchair can be made to turn by applying more power to one wheel than the other. The exact manner in which a wheelchair is steered and powered can, of course, vary based on the implementation and different types of wheel configurations, including front-wheel drive; mid-wheel drive and rear-wheel drive are commonly available. The interaction of the control system and the wheels is similar for all of the possible implementations of wheel arrangements.

Generally, the steering mechanism includes a control apparatus. In one common implementation, the control apparatus is comprised of a joystick that is positioned on an armrest of the wheelchair such that the user can control both the operation and the driving of the wheels by manipulating the joystick in the direction of desired travel. When the user wishes to go straight forward or back, the user points the joystick straight forward or back which engages the wheels to travel in the indicated direction. For turning, the user directs the joystick in both a forward and left or right orientation to turn left or right going forward and backward in a left or right orientation to turn left or right going backward. Often, pointing the joystick in the absolute right or left orientation results in the wheelchair turning without forward or backward orientation. It will be appreciated that the exact operation of the control apparatus for the wheelchair can vary depending upon its implementation without departing from the spirit of the present invention.

One difficulty that occurs with wheelchairs having the above-described control apparatus is that the apparatus is susceptible to being manipulated in an undesired manner. Generally, the joystick is very exposed on the armrest as it allows easier access for the user. However, since the joystick is exposed, it can be inadvertently contacted by the user. For example, the user may be reaching for an article located adjacent the wheelchair and inadvertently contact the joystick resulted in sudden, unexpected movement of the wheelchair. The joystick being exposed also poses a threat to snag sleeves and other parts of clothing that causes the joystick to activate the control system of the wheelchair. This may result in the wheelchair suddenly striking objects or persons nearby or even causing the users body to run into objects or persons. In some circumstances, the sudden movement may cause the user to be ejected from the chair.

A further difficulty that occurs is that the exposed nature of the joystick may also result in bystanders inadvertently contacting the joystick and causing similar sudden unexpected movement of the wheelchair. As an example, friends and family of the wheelchair user often congregate about the wheelchair when talking to the user. When they engage in physical contact with the user, giving hugs, shaking hands and the like, individuals may inadvertently depress or move the joystick thereby causing the wheelchair to move in an undesired and unexpected direction. Hence, there is a need for a mechanism whereby inadvertent movement of the wheelchair is inhibited. To this end, there is a need for an interrupting device that inhibits activation of the wheelchair's motor when such activation is not desired by the user of the wheelchair.

SUMMARY OF THE INVENTION

The aforementioned needs are satisfied by the wheelchair interlock device which, in one embodiment, includes a sensor and interlock system that senses the position of the user's hand, arm or wrist and inhibits movement of the wheelchair when the user is not in a pre-selected orientation where the user would ordinarily be using the wheelchair control system to control the movement of the wheelchair. It will be appreciated that the normal position for the user's hand, arm or wrist is in proximity to the joystick. However, with some user's a different metric for determining that the user is intending to move the wheelchair may be used, such as the forearm position, the wrist position, the finger position and the like.

In one specific implementation, a sensor, such as a Reed switch for example, is mounted in the armrest of the wheelchair proximate the control. The user then wears a bracelet or some other component on their body or the like having a detectable component, such as a magnet, that can be sensed by the sensor. The detectable component, in one exemplary component, is placed on the user's hand, arm or wrist in a location that the sensor engages the interlocking switch that allows the inputs of the joystick to be transmitted to the wheelchair control system. When the detectable component is moved away from the sensor the interlock switch does not allow the inputs of the joystick to be transmitted to the wheel chair control system.

There are times when an operator would like the interlock system to be deactivated for various reasons. In some instances the chair needs to be moved and the operator's hand, arm or wrist is not in the normal position to manipulate the joystick. In a worst case scenario the operator lost the delectable device. An override switch allows the user to deactivate the position sensor and permits all joystick inputs to activate the control system. In this way, the override switch acts as an on off switch for the interlock system.

Another possible implementation of the interlock system can be accomplished in chairs fitted with a programmable controller. A program can be written to only allow use of the joystick when the sensor has identified the detectable component. The switching between activation and deactivation of the joystick is still determined by the inputs of the sensor with regards to the proximity of the detectable component, but the job of the interlock switch is done simply by the programming parameters set.

A "programmable controller" embodiment of the present invention relies on a specified interaction between the override switch and the position sensor. As with the other embodiments of the present invention, a drive unit is mounted on the wheel chair (i.e. power chair) to move the chair, and there is a movement control device (e.g. a joystick) that can be selectively engaged between the drive unit and the chair to control movements of the chair. In all instances, an ability to operate the power chair depends on the ON or OFF status of the override switch which, in turn, is dependent on activation of the position sensor.

As intended for the present invention, the override switch must somehow be moved into an ON position for an operation of the power chair. When the override switch is in this ON position, the movement control device (joystick) of the power chair is electronically connected with the drive unit for operation of the chair. Alternatively, when the override switch is in its OFF position, the movement control device is disconnected from the drive unit and the power chair is effectively immobile. Importantly, unless otherwise specifically prevented by an interlock device, an inactive override switch is biased into the OFF position;

The position sensor which activates the override switch is conveniently mounted on the chair and is electronically connected to the override switch. More specifically, the position sensor is located adjacent to the movement control device and is oriented on the chair for convenient interaction with a detectable component. For the present invention, the detectable component is used by an operator of the chair to magnetically engage it (the detectable component) with the position sensor. With this magnetic engagement, the position sensor is activated and the override switch is turned ON. Preferably, the detectable component will be a ring or a bracelet that is worn by the operator and is selectively engaged with the position sensor when a hand of the operator is in position to manipulate the movement control device (joystick).

For an operation of the wheelchair, the override switch will be held in the ON position as long as the detectable component is engaged with the position sensor. With this engagement, the movement control device is connected with the drive unit to control movement of the chair. As an added feature for emergency or "one-time" situations, a manually operated interlock switch can be incorporated to turn the override switch ON, and thereby selectively bypass the position sensor for operation of the power chair.

Thus in the above embodiments, operators can avoid inadvertent activation of the wheelchair control system when their hand, arm, or wrist is not in the orientation that would trigger the position sensor. Inadvertent contact with the wheelchair control system by the user or third parties would not result in any motion of the wheelchair. These and other objects and advantages of the present invention will become more apparent from the following description taken in conjunction with the accompanying drawings.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
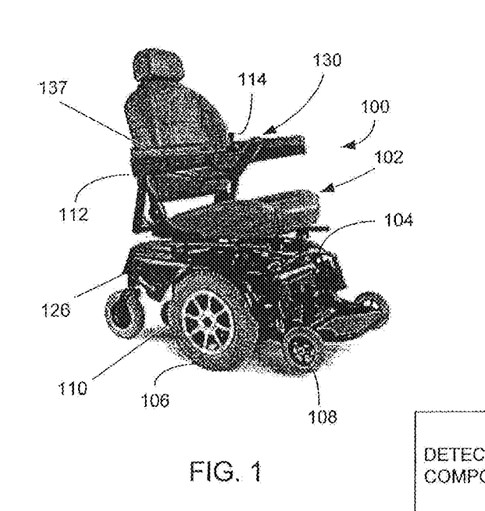
FIG. 1 is an illustration of a typical motorized wheelchair.

Reference will now be made to the drawings wherein like numerals refer to like parts throughout. Referring to FIG. 1, an exemplary motorized wheelchair 100 is illustrated. As indicated, the wheelchair 100 includes a seat 102 that accommodates the user. The seat is mounted on a chassis 104 that is attached to primary driving wheels 106 and secondary wheels 108. The chassis also accommodates a battery powered motor 110 that provides power to the driving wheels 106 for motion or turning.

In this implementation, the wheelchair 100 also includes armrests 112 and one of the armrests incorporates, in this embodiment, a wheelchair control unit 130 which contains a joystick 114.

The wheel chair control unit 130 is preferably positioned in a location that is easily accessible to the user such as in front of one of the armrests 112. The control system 126 which provides inputs to the motor 110 is housed discreetly in the rear or under the seat and is attached to the control unit 130 by a cable 137. In this embodiment when the joystick 114 is manipulated, the signal is carried to the control unit 130 which then passes the inputs to the control system 126 that then activates the motors 110 that turn the wheels 106 that move the chair 100. It will be appreciated that the wheelchair 100 illustrated in FIG. 1 is simply illustrative of any of a number of different styles and configurations of powered wheelchairs and the like that can receive the position sensor 122 and interlock switch of the present invention without departing from the spirit and scope of the present invention.

Figure 2:
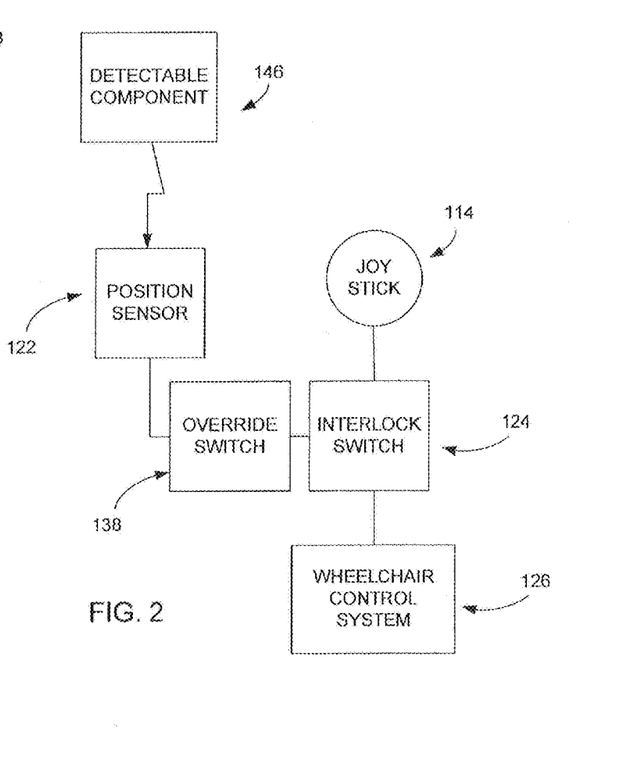
FIG. 2 is a simplified block diagram illustrating one embodiment of a wheelchair control system sensor and interlock device of the present invention.

Referring now to FIG. 2, a simplified block diagram illustrating an embodiment of the interlock system comprised of the joystick 114, interlock switch 124, position sensor 122 and detectable component 146, interlock override switch 138 and wheelchair control system 126 of the present invention on a control unit. In this implementation the position sensor 122 is placed on the wheelchair, specifically in this embodiment on the armrest 112, to determine whether the user's hand, wrist, or arm is in correct position to manipulate the joystick 114. The position sensor 122 determines the orientation of the operators hand, arm, or wrist through the use of a detectable component 146 worn by the operator. The position sensor 122 controls an interlock switch 124 so that only when the position sensor 122 perceives the detectable component 146 does it allow the inputs of the joystick 114 to activate the control system 126 that controls the delivery of power to the driving wheels 106. The override switch 138 acts as an on/off switch for the system if the user would like to not inhibit the use of the joystick and permit operation of the wheelchair without the detectable component.

Figure 3:
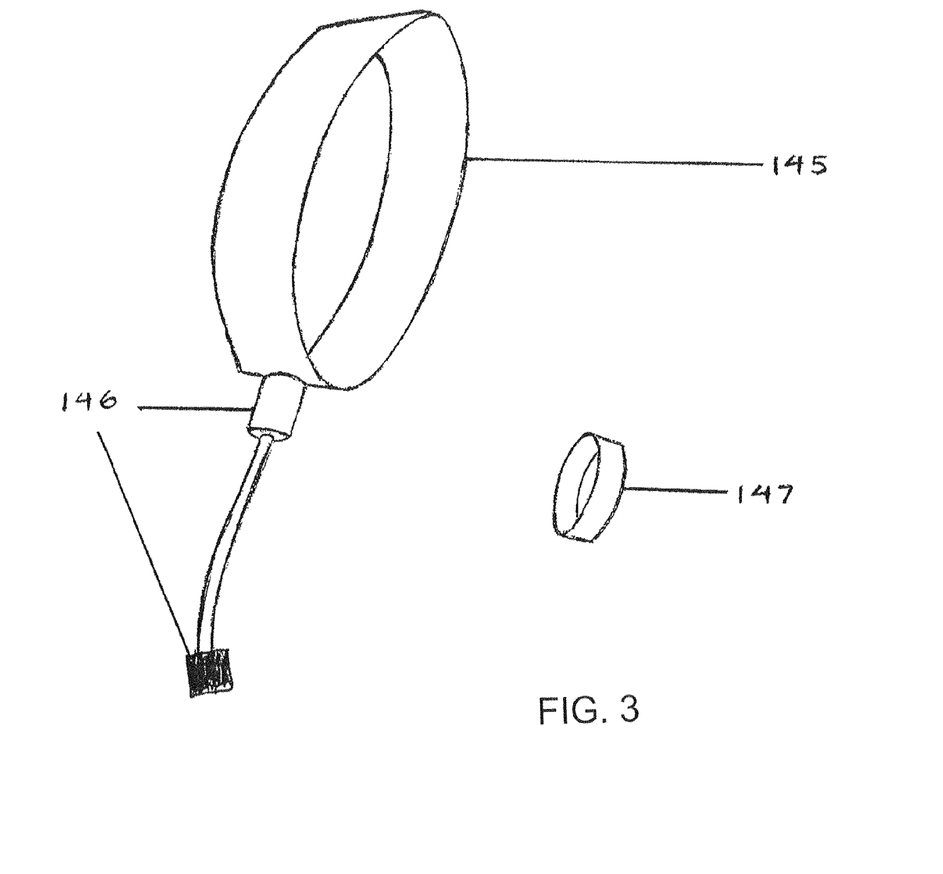
FIG. 3 is an illustration of a possible embodiment of the system.

FIG. 3 illustrates some of the applications of a bracelet 145 and ring 147 that could be used to fit detectable components 146 on a wheel chair user. It will be appreciated that in other implementations other types of proximity sensors, such as induction based sensors, LEDs and like may be used to discriminate between the user activating the wheelchair control system 126 on purpose and inadvertent activation by the user or others. While the foregoing has described the use of Reed switches and magnets there are a multitude of ways to determine the proximity of the hand, arm or wrist of the user.

It will be appreciated that basically any type of device that detects when the user is in a pre-determined orientation where the user would be manipulating the joystick 114 can be used without departing from the spirit of the present invention. Thus, this system is capable of distinguishing between intended manipulation of the joystick 114 by the user and inadvertent contact by the user or third parties. Consequently, the risk of sudden unexpected and unintended movement of the wheelchair 100 can be reduced.

Figure 4:
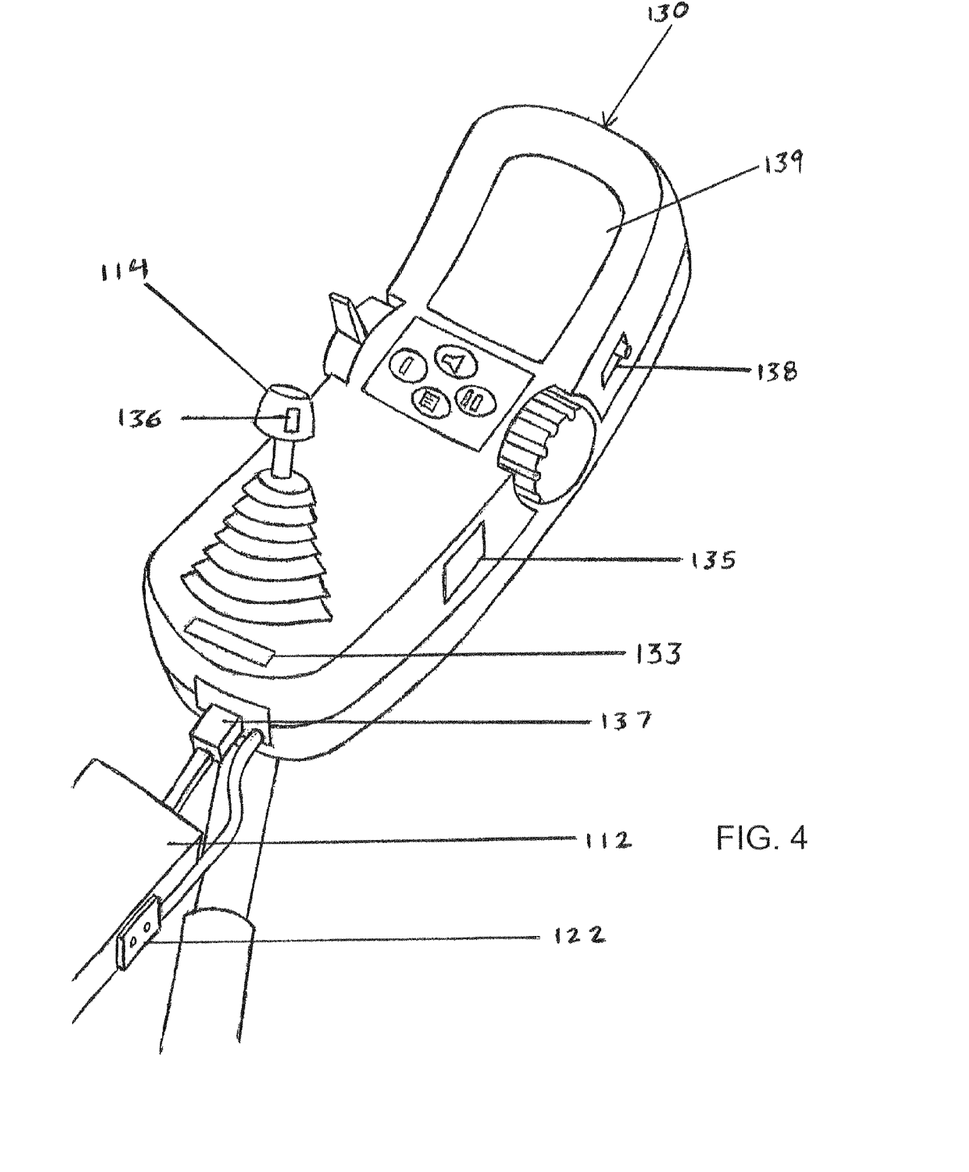
FIG. 4 is an illustration of the inside of a control unit as an example of a possible embodiment.

Referring now to FIG. 4, a detailed view of a possible implementation on a control unit 130, comprised of a display 139, interlock override switch 138, joystick 114, arm rest 112, position sensor 122, wheelchair controller cable 137, other possible locations for sensors 136, 135, 133. The user is fitted with a detectable component 146 which can be, without limitation, a magnet attached to a bracelet 145 or the ring 147. The position sensor 122 can be a Reed switch that detects the presence of the detectable component 146 and thereby transfers the input to the interlock switch 124 enclosed in the control unit 130. The detectable component 146 is preferably worn by the user in a location that it will only trigger the position sensor 122 when the user's wrist is in proximity to manipulate the joystick 114.

When the operator of the wheelchair 100 moves his wrist away and thus removes the detectable component 146, in this case a magnet, the position sensor 122 sends a signal to the interlock switch 124 to disable any and all joystick 114 input signals. Thus any accidental bumping of the joystick 114 by the operator or third party would not activate the control system 126 and the wheelchair 100 would not move.

Figure 5:
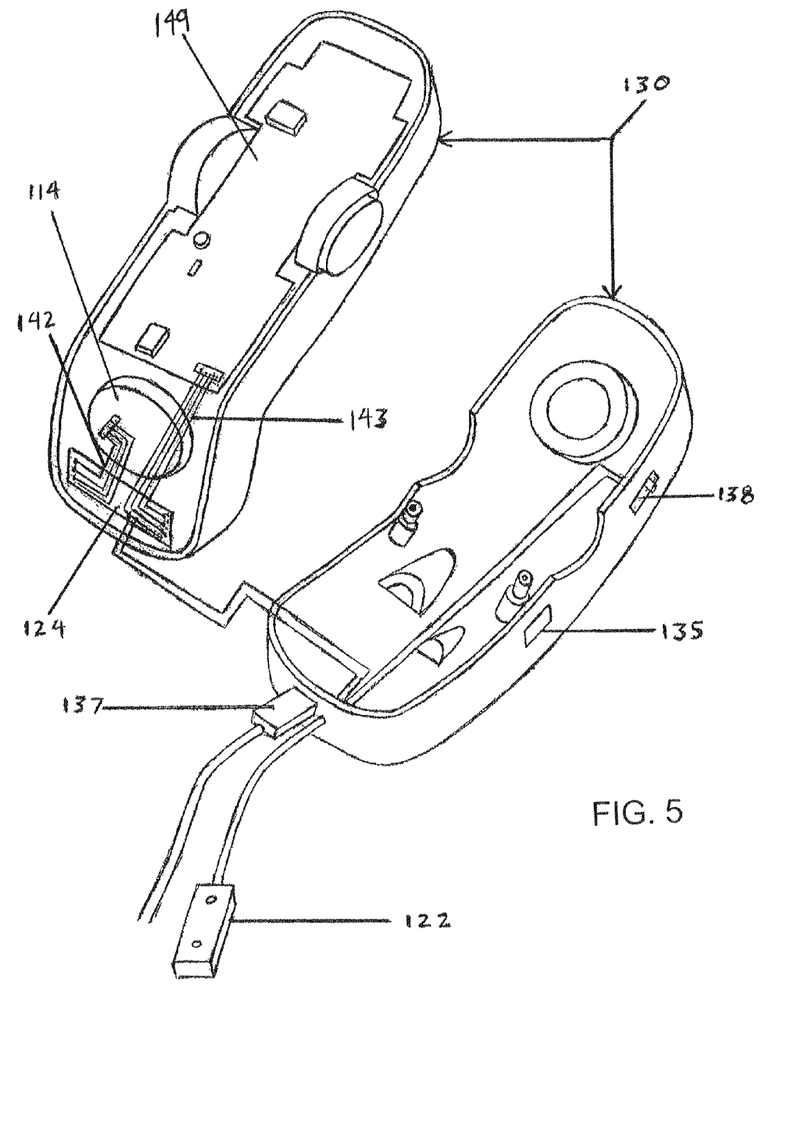
FIG. 5 is an illustration of some devices to fit wheelchair operators with detectable components.

Referring to FIG. 5, an illustration of a possible embodiment inside the control unit 130, depicting the arrangement of the interlock switch 124, position sensors 122, joystick 114, override switch 138, wheelchair controller cable 137, ribbon wire 142/143, other possible sensor location 135 and control unit circuit board 149. In this illustration the interlock switch 124 is installed between the joystick 114 output and the control unit circuit board 149. This is achieved by splicing into the ribbon wire 142/143. The position sensor 122 is wired into the interlock switch 124 to provide a signal when the detectable component 146 is in proximity. The interlock switch 124 enables or disables the inputs of the joystick 114 dependant on the position sensor 122. Inputs are given to the wheelchair control system 126 through the wheelchair controller cable 137 to the wheelchair control system 126 is thus controlled by the user's orientation.

The override switch 138 simply shorts out the position sensor 122 and disables the interlock switch 124. Due to the orientation of the joystick 114 at the end of this control unit 130 the position sensor 122 is located on the exterior, mounted on the armrest 112 in this embodiment. It should be noted that there are many other configurations that allow for position sensors 122 to be located within the control unit 130 itself. FIG. 4 has several possible locations for position sensors 122 noted at 133, 135 and 136.

Figure 6:
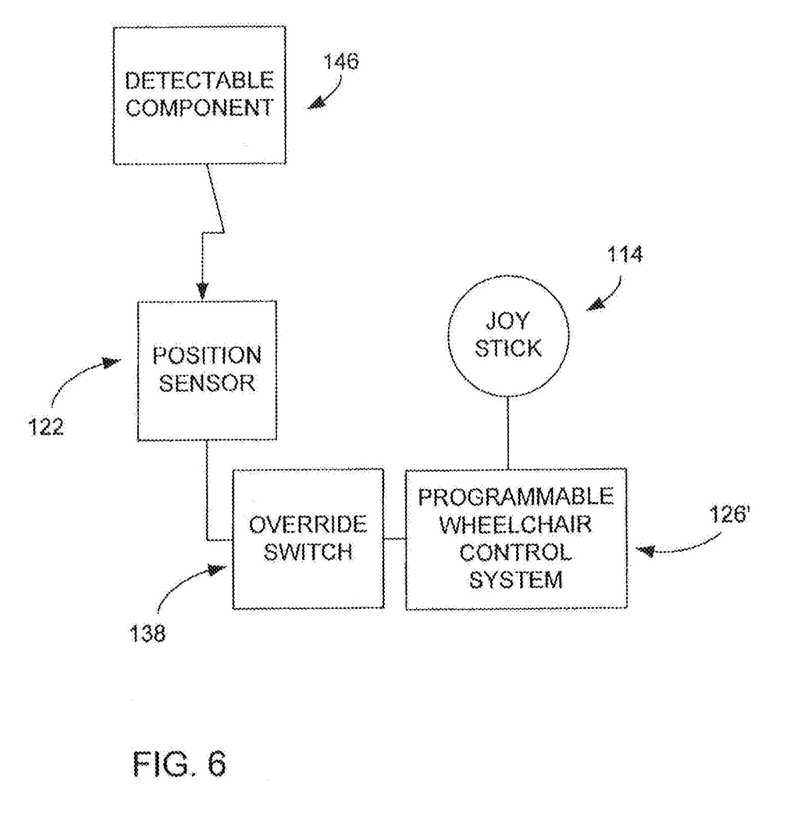
FIG. 6 block diagram illustrating possible embodiment of the interlock system in a wheelchair fitted with a programmable controller.

FIG. 6 is a block diagram of an embodiment where a programmable control system 126' is implemented with the present invention. This controller does not require the use of an interlock switch 124 because a programmable control system 126' can be programmed to only allow joystick 114 inputs to activate the control system 126' when the position sensor 122 is given a signal that the detectable component 146 is in proximity. The parameters of the controller can be set up to accomplish everything that the interlock switch 124 achieves in limiting the inputs of the joystick 114 through the programmable software.

It is thus apparent that various changes, alterations and modifications to the described embodiment may be made by those skilled in the art without departing from the scope, spirit and teachings of the present invention. Hence, the scope of the present invention should not be limited to the foregoing described embodiments but should extend to the fullest extent permissible by current law as well as defined by the appended claims.

Figure 7:
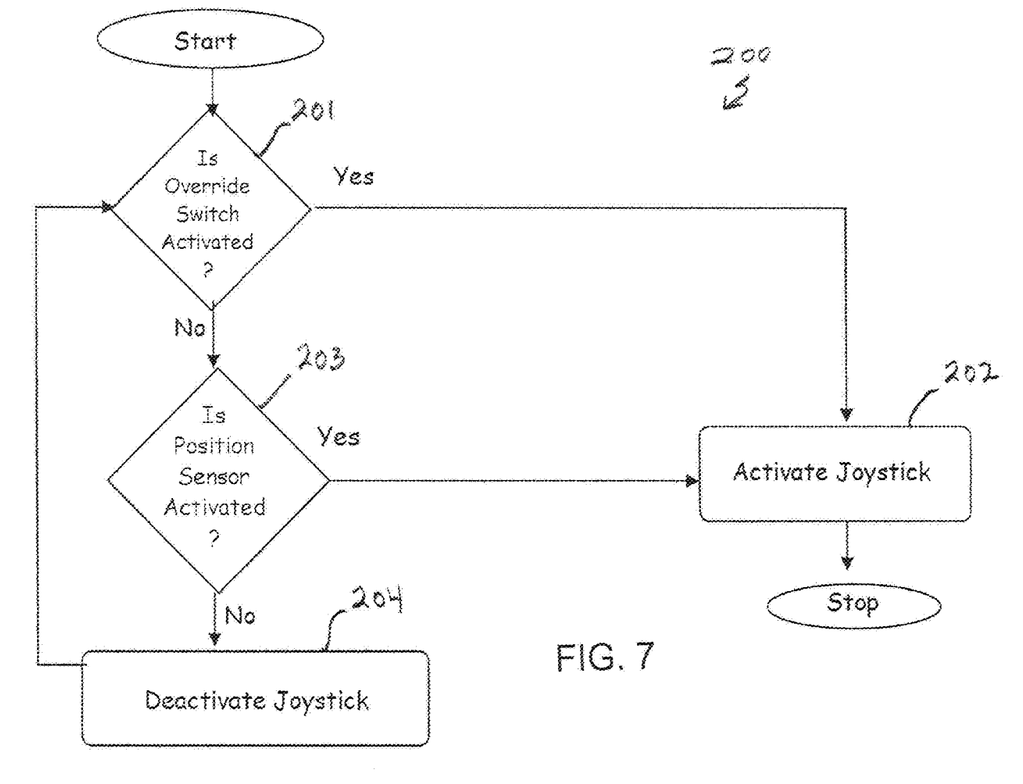
FIG. 7 is a logic flow chart illustrating the operational attributes of a programmable controller for the present invention.

Referring now to FIG. 7, a logic flow chart is shown and is generally designated 200. More specifically, the logic flow chart 200 shows the sequencing of tasks that necessarily occur to establish an operational control over the wheelchair 100 (also referred elsewhere herein as "power chair" or simply "chair").

As shown by the inquiry block 201 in FIG. 7, an operation of the wheelchair 100 is dependent on whether the override switch 138 is an ON position or in an OFF position. If the override switch 138 is ON (i.e. it is activated: Yes), action block 202 indicates that the joystick 114 is also activated and can, therefore, be manipulated to control movements of the wheelchair 100. On the other hand, if the override switch is OFF (i.e. not activated: No), chart 200 indicates there is a follow-on inquiry involving the position sensor 122 that is shown by the inquiry block 203.

In accordance with the present invention, the override switch 138 is biased to be in its OFF position when the position sensor 122 is not activated (see block 203). Consequently, unless the override switch 138 is somehow intentionally manipulated into its ON position at the beginning of an operation of the wheelchair 100, the override switch will be OFF (i.e. not active: No). Inquiry block 203 then determines whether the position sensor 122 has been activated. Typically, this will be accomplished when the detectable component 146 triggers the position sensor 122. Note: the override switch 138 can, however, be manually moved into the ON position if required, such as in an emergency "one time" situation. In any case, when the position sensor 122 has been activated, block 202 of chart 200 shows that the joystick 114 will be operational. Otherwise, when the position sensor 122 is not activated, inquiry block 203 moves an operation of wheelchair 100 to action block 204 which indicates that the joystick 114 is deactivated.

As shown in FIG. 7, the joystick 114 will remain deactivated (i.e. wheelchair 100 remains immobile) until the joystick 114 is activated by positioning the override switch 138 in its ON position (see action block 201). Recall, the override switch 138 is biased into its OFF position. Consequently, in a normal operation it is necessary for the position sensor 122 to be activated by the detectable component 146 in order to turn the override switch 138 ON. As intended for the present invention, in its normal operation the override switch 138 will then remain ON until the detectable component 146 is removed and disengaged from the control system 126.

While the particular Motorized Wheelchair Interlock as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A power chair which comprises:
   a drive unit mounted on the chair for moving the chair;
   a movement control device mounted on the chair;
   an override switch, wherein the override switch is selectively moved into an ON position to interconnect the movement control device with the drive unit, and is alternatively moved into an OFF position for disconnecting the movement control device from the drive unit, wherein the override switch is biased into the OFF position;

a position sensor mounted on the chair and electronically connected to the override switch; and a detectable component selectively moved by an operator of the chair into engagement with the position sensor, to activate the position sensor and hold the override switch in the ON position while the detectable component is engaged with the position sensor, for connecting the movement control device with the drive unit to control movement of the chair.

2. A power chair as recited in claim 1 further comprising an interlock switch electronically connected between the position sensor and the override switch to selectively bypass the position sensor for manual operation of the override switch.

3. A power chair as recited in claim 1 wherein the movement control device is a joystick.

4. A power chair as recited in claim 1 wherein the movement control device is a programmable control system.

5. A power chair as recited in claim 1 wherein the detectable component is magnetically engaged with the position sensor to activate the position sensor.

6. A power chair as recited in claim 5 wherein the position sensor is located on the chair adjacent to the movement control device, and the detectable component is worn by the operator of the chair.

7. A power chair as recited in claim 6 wherein the detectable component is selected from a group comprising a ring and a bracelet.

8. A switching system for operating a power chair which comprises:

an override switch movable between an ON position wherein the chair can be directly driven by a propulsion unit for movement of the chair, and an OFF position wherein the propulsion unit is idled, wherein the override switch is biased into the OFF position;

a position sensor for selectively moving the override switch from the OFF position to the ON position; and a detachable component selectively moved by operator of the chair into an engagement of the detectable component with the position sensor, to activate the position sensor and hold the override switch in the ON position while the detectable component is engaged with the position sensor.

9. A system as recited in claim 8 wherein the propulsion unit comprises:

a drive unit mounted on the chair for moving the chair; and a movement control device mounted on the chair and connected to the drive unit via the override switch to control movement of the chair.

10. A system as recited in claim 9 wherein the movement control device is a joystick.

11. A system as recited in claim 9 wherein the movement control device is a programmable control system.

12. A system as recited in claim 9 wherein the position sensor is mounted on the chair and is electrically connected to the override switch.

13. A system as recited in claim 12 wherein the position sensor is located on the chair adjacent to the movement control device, and the detectable component is worn by the operator of the chair.

14. A system as recited in claim 13 wherein the detectable component is magnetically engaged with the position sensor to activate the position sensor.

15. A system as recited in claim 13 wherein the detectable component is selected from a group comprising a ring and a bracelet.

16. A method for assembling a control unit for a power chair which comprises the steps of:

mounting an override switch on the chair, wherein the override switch is movable between an ON position and an OFF position, and wherein with the override switch in the ON position a propulsion of the chair can be provided by a drive unit and the resultant movement of the chair can be controlled by a movement control device, and wherein with the override switch in the OFF position the drive unit is idled, and further wherein the override switch is biased into the OFF position;

locating a position sensor on the chair adjacent to the override switch, with the position sensor electronically connected to the override switch;

providing a detectable component for selective engagement of the detectable component with the position sensor to move the override switch from the OFF position to the ON position during an engagement of the detectable component with the position sensor.

17. A method as recited in claim 16 wherein the movement control device is a joystick.

18. A method as recited in claim 16 wherein the movement control device is a programmable control unit.

19. A method as recited in claim 16 wherein the detectable component is worn by the operator of the chair.

20. A method as recited in claim 16 wherein the detectable component is magnetically engaged with the position sensor to activate the position sensor.

* * * * *